(12) United States Patent
Kikui

(10) Patent No.: US 6,549,610 B2
(45) Date of Patent: Apr. 15, 2003

(54) SUBSCRIBER CIRCUIT HAVING SPLITTER DISCONNECTION FUNCTION

(75) Inventor: Hideki Kikui, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 09/883,325

(22) Filed: Jun. 19, 2001

(65) Prior Publication Data

US 2001/0053205 A1 Dec. 20, 2001

(30) Foreign Application Priority Data

Jun. 19, 2000 (JP) ........................ 2000-183657

(51) Int. Cl.[7] .......................... H04M 1/24; H04M 3/08; H04M 3/22
(52) U.S. Cl. .................. 379/29.01; 379/9.06; 379/16; 379/17; 379/26.01
(58) Field of Search ........................ 379/1.01, 1.03, 379/1.04, 8, 9, 9.06, 12, 15.01, 17, 22, 26.01, 27.01, 29.01, 32.02, 32.04, 16, 22.04

(56) References Cited

U.S. PATENT DOCUMENTS

| | | | |
|---|---|---|---|
| 6,181,775 B1 | * | 1/2001 | Bella .......................... 379/29 |
| 6,212,258 B1 | * | 4/2001 | Bella .......................... 379/29 |
| 6,278,769 B1 | * | 8/2001 | Bella ....................... 379/29.11 |
| 6,301,337 B1 | * | 10/2001 | Scholtz et al. .................. 379/30 |
| 6,366,644 B1 | * | 4/2002 | Sisk et al. ................. 379/1.04 |
| 6,373,923 B1 | * | 4/2002 | Williamson et al. ..... 379/22.01 |
| 6,449,362 B1 | * | 9/2002 | Tennyson et al. ....... 379/413.02 |
| 6,453,016 B1 | * | 9/2002 | Chea, Jr. ................. 379/29.01 |
| 2002/0122539 A1 | * | 9/2002 | Chea, Jr. et al. ......... 379/27.01 |

FOREIGN PATENT DOCUMENTS

| | | | | |
|---|---|---|---|---|
| EP | 1 175 078 A2 | * | 1/2002 | ......... H04M/11/06 |
| JP | 11-308352 | | 11/1999 | ......... H04M/11/00 |
| WO | WO 01/65816 A3 | * | 9/2001 | ............ H04M/3/13 |
| WO | WO 02/49333 A1 | * | 6/2002 | ............ H04M/3/30 |

* cited by examiner

Primary Examiner—Binh Tieu
(74) Attorney, Agent, or Firm—Young & Thompson

(57) ABSTRACT

A subscriber circuit allowing a reliable and proper subscriber line test is disclosed. The subscriber circuit includes a splitter and a feeder for feeding a current to subscriber equipment through a subscriber line. A path selector is provided to select one of a first path and a second path between the subscriber line and the feeder. The first path has the splitter inserted therein and the second path has no splitter inserted therein. The path selector normally selects the first path. When the subscriber line test instruction is received, the path selector selects the second path.

9 Claims, 2 Drawing Sheets

SUBSCRIBER CIRCUIT HAVING SPLITTER DISCONNECTION FUNCTION

BACKGROUND OF THE INVENTION

1. Field of the Invention

The present invention relates to digital subscriber line (xDSL) network systems permitting transmission of digital data signals over conventional telephone lines used for plain old telephone service (POTS), and in particular to a subscriber circuit in a telephone central office, connected to an interface unit at a subscriber location through a conventional telephone line.

2. Description of the Related Art

The existing public telephone network has been increasingly used to transmit digital data although it was originally designed for transmitting analog voice signals.

Digital Subscriber Line (xDSL) technology allows the telephone service and high-speed data transmission service over POTS lines. Especially, data transmission of Asymmetric DSL (ADSL) permits transmission of digital data over the conventional twisted wire pairs that are used for POTS, providing for an upstream channel at a maximum rate of 1 megabits per second (Mbps) and a downstream channel at a maximum rate of 9 Mbps.

The basic ADSL architecture has an ADSL interface unit at the telephone central office and an ADSL interface unit at the subscriber location. Each ADSL interface unit includes a POTS splitter or filter and ADSL modem.

In Japanese Patent Application Unexamined Publication No. 11-308352, an ADSL communication system has been disclosed, which is provided with a path switch at each of the central office and the subscriber location. When the telephone service is stopped, a controller deactivates the splitter and activates the path switch to connect the subscriber line directly to the ADSL mode. As a result, the frequency bandwidth assigned to the telephone service can be efficiently used.

However, the conventional architecture as described above is provided with the splitter between the subscriber circuit and the subscriber terminal. In general, a splitter has a filter composed of a coil and a capacitor to split multiplexed signals on the subscriber line into an analog POTS signal and a high-speed digital data signal. Accordingly, it is not possible to properly perform an accurate subscriber line test through such a splitter.

SUMMARY OF THE INVENTION

An object of the present invention is to provide a subscriber circuit allowing a reliable and proper subscriber line test.

According to the present invention, a subscriber circuit connected to subscriber equipment through a subscriber line, includes: a splitter for splitting a signal on the subscriber line into a lower-frequency band signal and a higher-frequency band signal; a feeder for feeding a current to the subscriber equipment through the subscriber line; a path selector for selecting one of a first path and a second path between the subscriber line and the feeder, wherein the first path has the splitter inserted therein and the second path has no splitter inserted therein; and a controller controlling path selection of the path selector depending on whether a subscriber line test instruction is received from a host.

The path selector normally selects the first path. When the subscriber line test instruction is received, the path selector selects the second path.

According to an aspect of the present invention, a subscriber circuit connected to subscriber equipment through a subscriber line, includes: a splitter for splitting a signal on the subscriber line into a lower-frequency band signal and a higher-frequency band signal; a feeder for feeding a current to the subscriber equipment through the subscriber line; a switch connected to the subscriber line, for selectively connecting and disconnecting the feeder to the subscriber line; a path selector connected between the switch and the feeder, for selecting one of a first path and a second path, wherein the first path has the splitter inserted therein and the second path directly connects the feeder and the switch; and a controller controlling the switch and the path selector depending on whether a subscriber line test instruction is received from a host.

The path selector may include: a first selector having a first common port and first and second selection ports, wherein the first common port is connected to the switch and the first selection port is connected to the splitter; and a second selector having a second common port and third and fourth selection ports, wherein the second common port is connected to the feeder, the third selection port is connected to the first selection port of the first selector through the splitter to form the first path, and the fourth selection port is connected directly to the second selection port of the first selector to form the second path.

According to another aspect of the present invention, a subscriber circuit connected to subscriber equipment through a subscriber line, includes: a splitter for splitting a signal on the subscriber line into a lower-frequency band signal and a higher-frequency band signal; a feeder for feeding a current to the subscriber equipment through the subscriber line; a selector connected to the subscriber line, for selecting one of a first path and a second path, wherein the first path has the splitter inserted therein and the second path directly connects the feeder and the subscriber line; a switch for selecting one of the first path and the second path synchronously with the selector, wherein the switch selectively connects and disconnects the feeder to the subscriber line; and a controller controlling the switch and the selector depending on whether a subscriber line test instruction is received from a host.

Preferably, the selector has a first common port and first and second selection ports, wherein the first common port is connected to the subscriber line and the first selection port is connected to the splitter. The switch has a second common port and third and fourth selection ports, wherein the second common port is connected to the feeder, the third selection port is connected to the first selection port of the first selector through the splitter to form the first path, and the fourth selection port is connected directly to the second selection port of the first selector to form the second path.

As described above, according to the present invention, the splitter is incorporated within the subscriber circuit in such a manner that the splitter can be isolated from a current feeding system. Accordingly, a reliable and proper subscriber line test can be achieved.

DESCRIPTION OF THE PREFERRED EMBODIMENTS

Figure 1:
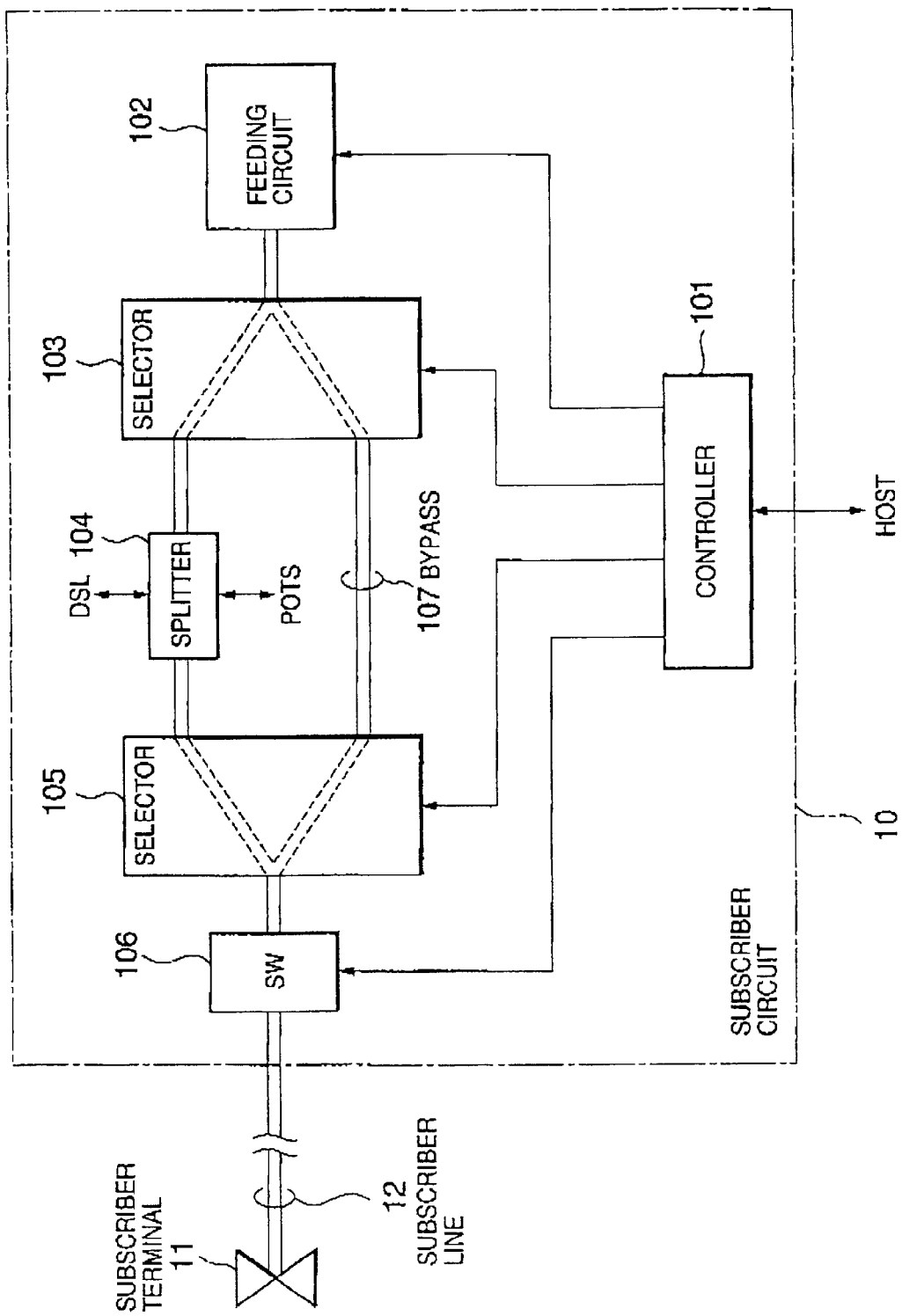
FIG. 1 is a block diagram showing a subscriber circuit according to a first embodiment of the present invention.

Referring to FIG. 1, a telephone company central office is provided with a plurality of subscriber circuits according to a first embodiment of the present invention, each of which accommodates corresponding subscriber equipment. A subscriber circuit 10 is connected to a corresponding subscriber terminal 11 through a subscriber line 12 that is an ordinary telephone line composed of a twisted wire pair.

The subscriber circuit 10 includes a controller 101, a feeding circuit 102, a selector 103, a splitter 104, a selector 105, a switch 106, and other necessary circuits (not shown). The controller 101 controls the feeding circuit 102, the selector 103, the selector 105, and the switch 106 depending on control information received from a host.

The feeding circuit 102 supplies a necessary current to the subscriber terminal 11 through the subscriber line 12 under control of the controller 101.

The common port of the selector 103 is connected to the feeding circuit 102 and the common port of the selector 105 is connected to the switch 106. Selection ports of the selectors 103 and 105 are connected to the splitter 104 to form a path and the other selection ports thereof are directly connected to form a bypass 107. The selectors 103 and 105 are synchronized to select one of the path through the splitter 104 and the bypass 107 under control of the controller 101.

The splitter 104 connected between the selectors 103 and 105 is composed of a low pass filter to isolate a POTS frequency band from an ADSL frequency band which is higher than the POTS frequency band.

The switch 106 connects the subscriber line 12 to the common port of the selector 105 and performs connection and disconnection of the subscriber line 12 to the feeding circuit 102 under control of the controller 101.

The controller 101 controls the feeding circuit 102, the selector 103, the selector 105, and the switch 106 depending on whether the subscriber line test is performed. The details will be described hereafter.

The path of the splitter 104 is normally selected to connect the feeding circuit 102 to the subscriber line 12 through the splitter 104. The bypass 107 is selected to connect the feeding circuit 102 directly to the switch 106 when the subscriber line test is performed.

More specifically, when normally, that is, the subscriber line test is not performed, the controller 101 receives control information instructing not to perform the subscriber line test and therefore instructs the selectors 103 and 105 to select the path of the splitter 104. Accordingly, the splitter 104 is connected between the switch 106 and the feeding circuit 102 and thereby a predetermined current required for telephone communication is supplied to the subscriber terminal 11 and the subscriber line 12 through the switch 106.

On the other hand, when the subscriber line test is performed, the controller 101 receives control information instructing to perform the subscriber line test and detects test conditions from it. Following the test conditions, the controller 101 instructs the selectors 103 and 105 to select the bypass 107 to connect the feeding circuit 102 directly to the switch 106. Thereafter, the controller 101 controls the feeding circuit 102 and the switch 106 so as to perform the designated subscriber line test. For example, a test current is supplied from the feeding circuit 102 to the subscriber line 12 through the switch 106 without the intervention of the splitter 104. In other words, the splitter 104 is isolated from the subscriber line test system. Accordingly, the subscriber line test can be accurately and reliably performed without influence of the low pass filter of the splitter 104.

Figure 2:
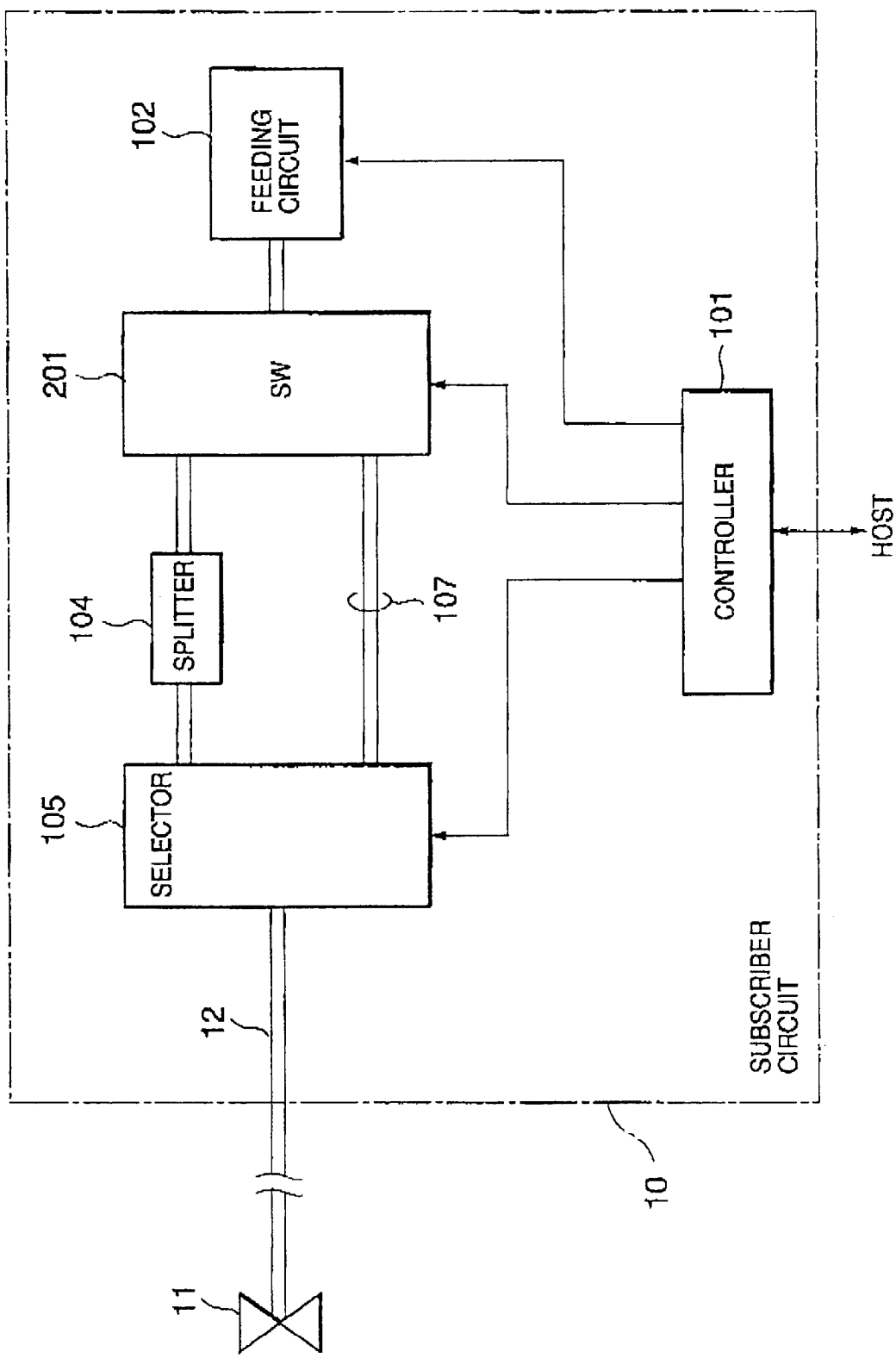
FIG. 2 is a block diagram showing a subscriber circuit according to a second embodiment of the present invention.

Referring to FIG. 2, a subscriber circuit according to a second embodiment of the present invention differs from the first embodiment of FIG. 1 in that a switch 201 is provided in replace of the selector 103 of FIG. 1. In FIG. 2, other blocks similar to those previously described with reference to FIG. 1 are denoted by the same reference numerals and the descriptions will be omitted.

The switch 201 has a common port and two selection ports and further a function of connection and disconnection of the feeding circuit 102 under control of the controller 101.

The common port of the switch 201 is connected to the feeding circuit 102 and the common port of the selector 105 is connected to the subscriber line 12. Selection ports of the switch 201 and the selector 105 are connected to the splitter 104 to form a path and the other selection ports thereof are directly connected to form a bypass 107. The switch 201 and the selector 105 are synchronized to select one of the path through the splitter 104 and the bypass 107 under control of the controller 101.

The controller 101 controls the feeding circuit 102, the switch 201, and the selector 105 depending on whether the subscriber line test is performed. The details will be described hereafter.

As in the case of FIG. 1, the path of the splitter 104 is normally selected to connect the feeding circuit 102 to the subscriber line 12 through the splitter 104. When the subscriber line test is performed, the bypass 107 is selected to connect the feeding circuit 102 directly to the subscriber line 12.

More specifically, when the subscriber line test is not performed, the controller 101 instructs the switch 201 and the selector 105 to select the path of the splitter 104. Accordingly, the splitter 104 is connected between the subscriber line 12 and the feeding circuit 102 and thereby a predetermined current required for telephone communication is supplied to the subscriber terminal 11 and the subscriber line 12.

When the subscriber line test is performed, the controller 101 receives control information instructing to perform the subscriber line test and detects test conditions from it. Following the test conditions, the controller 101 instructs the switch 201 and the selector 105 to select the bypass 107 to connect the feeding circuit 102 directly to the subscriber line 12. Thereafter, the controller 101 controls the feeding circuit 102 so as to perform the designated subscriber line test. For example, a test current is supplied from the feeding circuit 102 directly to the subscriber line 12 without the intervention of the splitter 104. Accordingly, as in the case of the first embodiment, the subscriber line test can be accurately and reliably performed without influence of the low pass filter of the splitter 104.

According to the first and second embodiments as described above, the splitter 104 is incorporated within the subscriber circuit 10 in such a manner that the splitter 104 can be isolated from the current feeding system. Accordingly, a reliable and proper subscriber line test can be achieved and further the work of splitter connection to the subscriber line can be eliminated.

What is claimed is:

1. A subscriber circuit connected to subscriber equipment through a subscriber line, comprising:
   a splitter for splitting a signal on the subscriber line into a lower-frequency band signal and a higher-frequency band signal;
   a feeder for feeding a current to the subscriber equipment through the subscriber line;
   a path selector for selecting one of a first path and a second path between the subscriber line and the feeder, wherein the first path has the splitter inserted therein and the second path has no splitter inserted therein; and a controller controlling path selection of the path selector depending on whether a subscriber line test instruction is received from a host.

2. The subscriber circuit according to claim 1, wherein the path selector normally selects the first path and, when the subscriber line test instruction is received, selects the second path.

3. A subscriber circuit connected to subscriber equipment through a subscriber line, comprising:

a splitter for splitting a signal on the subscriber line into a lower-frequency band signal and a higher-frequency band signal;

a feeder for feeding a current to the subscriber equipment through the subscriber line;

a switch connected to the subscriber line, for selectively connecting and disconnecting the feeder to the subscriber line;

a path selector connected between the switch and the feeder, for selecting one of a first path and a second path, wherein the first path has the splitter inserted therein and the second path directly connects the feeder and the switch; and a controller controlling the switch and the path selector depending on whether a subscriber line test instruction is received from a host.

4. The subscriber circuit according to claim 3, wherein the path selector comprises:

a first selector having a first common port and first and second selection ports, wherein the first common port is connected to the switch and the first selection port is connected to the splitter; and a second selector having a second common port and third and fourth selection ports, wherein the second common port is connected to the feeder, the third selection port is connected to the first selection port of the first selector through the splitter to form the first path, and the fourth selection port is connected directly to the second selection port of the first selector to form the second path.

5. The subscriber circuit according to claim 4, wherein when normally, the first selector connects the first selection port to the first common port and the second selector connects the third selection port to the second common port, and when the subscriber line test instruction is received, the first selector connects the second selection port to the first common port and the second selector connects the fourth selection port to the second common port.

6. A subscriber circuit connected to subscriber equipment through a subscriber line, comprising:

a splitter for splitting a signal on the subscriber line into a lower-frequency band signal and a higher-frequency band signal;

a feeder for feeding a current to the subscriber equipment through the subscriber line;

a selector connected to the subscriber line, for selecting one of a first path and a second path, wherein the first path has the splitter inserted therein and the second path directly connects the feeder and the subscriber line;

a switch for selecting one of the first path and the second path synchronously with the selector, wherein the switch selectively connects and disconnects the feeder to the subscriber line; and a controller controlling the switch and the selector depending on whether a subscriber line test instruction is received from a host.

7. The subscriber circuit according to claim 6, wherein the selector has a first common port and first and second selection ports, wherein the first common port is connected to the subscriber line and the first selection port is connected to the splitter; and the switch has a second common port and third and fourth selection ports, wherein the second common port is connected to the feeder, the third selection port is connected to the first selection port of the first selector through the splitter to form the first path, and the fourth selection port is connected directly to the second selection port of the first selector to form the second path.

8. The subscriber circuit according to claim 7, wherein when normally, the selector connects the first selection port to the first common port and the switch connects the third selection port to the second common port, and when the subscriber line test instruction is received, the selector connects the second selection port to the first common port and the switch connects the fourth selection port to the second common port.

9. A control method for a subscriber circuit connected to subscriber equipment through a subscriber line, the control method comprising the steps of:

preparing a first path and a second path between the subscriber line and a feeder that feeds a current to the subscriber equipment through the subscriber line, wherein the first path has a splitter that splits a signal on the subscriber line into a lower-frequency band signal and a higher-frequency band signal inserted therein and the second path has no splitter inserted therein;

determining whether a subscriber line test instruction is received from a host;

when no subscriber line test instruction is received, selecting the first path; and when the subscriber line test instruction is received, selecting the second path.

* * * * *